(12) United States Patent
Kumar et al.

(10) Patent No.: US 8,799,586 B2
(45) Date of Patent: Aug. 5, 2014

(54) MEMORY MIRRORING AND MIGRATION AT HOME AGENT

(75) Inventors: Ganesh Kumar, Fort Collins, CO (US); Dheemanth Nagaraj, Bangalore (IN); Vincent R. Freytag, Windsor, CO (US); Eric Delano, Fort Collins, CO (US); Gregory S. Averill, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 791 days.

(21) Appl. No.: 12/571,382

(22) Filed: Sep. 30, 2009

(65) Prior Publication Data

US 2011/0078384 A1    Mar. 31, 2011

(51) Int. Cl.
G06F 12/08    (2006.01)
G06F 12/16    (2006.01)

(52) U.S. Cl.
USPC ............ 711/144; 711/143; 711/E12.033; 711/146; 711/162; 711/E12.027

(58) Field of Classification Search
None
See application file for complete search history.

(56) References Cited

U.S. PATENT DOCUMENTS

| | | | |
|---|---|---|---|
| 5,699,510 A | 12/1997 | Petersen et al. | |
| 5,832,306 A | 11/1998 | Martin | |
| 5,987,506 A * | 11/1999 | Carter et al. .................. | 709/213 |
| 6,009,488 A | 12/1999 | Kavipurapu | |
| 6,035,436 A | 3/2000 | Wu et al. | |
| 6,349,368 B1 | 2/2002 | Arimilli et al. | |
| 6,401,174 B1 | 6/2002 | Hagersten et al. | |
| 6,536,000 B1 | 3/2003 | Jackson et al. | |
| 6,725,343 B2 | 4/2004 | Barroso et al. | |
| 7,177,987 B2 | 2/2007 | Doren et al. | |
| 7,475,321 B2 | 1/2009 | Gurumurthi et al. | |
| 7,543,179 B2 | 6/2009 | Zimmer et al. | |
| 7,587,575 B2 | 9/2009 | Moertl et al. | |
| 7,600,080 B1 * | 10/2009 | Bhattacharyya et al. ..... | 711/143 |
| 7,962,696 B2 | 6/2011 | Steely, Jr. et al. | |
| 2002/0124143 A1 | 9/2002 | Barroso et al. | |
| 2004/0008712 A1 | 1/2004 | Yoshimoto et al. | |
| 2005/0160230 A1 * | 7/2005 | Doren et al. .................. | 711/141 |
| 2006/0212762 A1 | 9/2006 | Zimmer et al. | |
| 2007/0073856 A1 | 3/2007 | Tsien | |
| 2007/0150664 A1 | 6/2007 | Domdrowski et al. | |
| 2007/0244987 A1 | 10/2007 | Pedersen et al. | |

(Continued)

FOREIGN PATENT DOCUMENTS

CN    101165664 A    4/2008
CN    102033817 A    4/2011

(Continued)

OTHER PUBLICATIONS

International Search Report and Written Opinion Received for PCT Application No. PCT/US2010/048709, mailed on Jun. 1, 2011, 8 pages.
International Preliminary Report on Patentability Received for PCT Patent Application No. PCT/US2010/046658, mailed on Apr. 12, 2012, 6 pages.
International Search Report and Written Opinion Received for PCT Application No. PCT/US2010/046658, mailed on Apr. 28, 2011, 9 pages.

(Continued)

Primary Examiner — Denise Tran
(74) Attorney, Agent, or Firm — Caven & Aghevli LLC

(57) ABSTRACT

Methods and apparatus relating to memory mirroring and migration at a Home Agent (HA) are described. In one embodiment, a home agent may mirror its data at a slave agent. In some embodiments, a bit in a directory may indicate status of cache lines. Other embodiments are also disclosed.

23 Claims, 7 Drawing Sheets

(56) References Cited

U.S. PATENT DOCUMENTS

| | | | |
|---|---|---|---|
| 2008/0091915 A1 | 4/2008 | Moertl et al. | |
| 2008/0104321 A1 | 5/2008 | Kamisetty et al. | |
| 2008/0313495 A1 | 12/2008 | Huff | |
| 2009/0125788 A1 | 5/2009 | Wheeler et al. | |
| 2010/0293437 A1 | 11/2010 | Gollub et al. | |
| 2010/0332720 A1 | 12/2010 | Chang et al. | |
| 2010/0332767 A1* | 12/2010 | Kumar et al. | 711/146 |
| 2011/0078492 A1 | 3/2011 | Kumar et al. | |

FOREIGN PATENT DOCUMENTS

| | | |
|---|---|---|
| TW | 200809497 A | 2/2008 |
| TW | 201124840 A1 | 7/2011 |
| WO | 2004008712 A1 | 1/2004 |
| WO | 2011/041047 A1 | 4/2011 |
| WO | 2011/041095 A2 | 4/2011 |
| WO | 2011/041047 A3 | 6/2011 |
| WO | 2011/041095 A3 | 7/2011 |

OTHER PUBLICATIONS

Office Action Received for U.S. Appl. No. 12/492,280, mailed on Mar. 22, 2012, 17 pages.
Office Action Received for U.S. Appl. No. 12/571,381, mailed on Apr. 2, 2012, 14 pages.
International Preliminary Report on Patentability Received for PCT Application No. PCT/US2010/048709, mailed on Apr. 12, 2012, 6 pages.
Notice of Allowance Received for U.S. Appl. No. 12/571,381, mailed on Aug. 10, 2012, 6 pages.
Office Action received for Chinese Patent Application No. 201010543977.X, mailed on Jan. 29, 2013, 7 pages of Office Action and 12 pages of English Translation.
Office Action received for the Taiwanese Patent Application No. 099131445, mailed on May 29, 2013, 17 pages including 9 pages of English Translation.
Office Action Received for Chinese Patent Application No. 201010543977.X, mailed on Apr. 10, 2014, 8 pages of office action including 5 pages of english translation.

* cited by examiner

MEMORY MIRRORING AND MIGRATION AT HOME AGENT

FIELD

The present disclosure generally relates to the field of electronics. More particularly, an embodiment of the invention relates to memory mirroring and migration at a Home Agent (HA).

BACKGROUND

Cache memory in computer systems may be kept coherent using a snoopy bus or a directory based protocol. In either case, a memory address is associated with a particular location in the system. This location is generally referred to as the "home node" of a memory address.

In a directory based protocol, processing/caching agents may send requests to a home node for access to a memory address with which a corresponding "home agent" is associated. Accordingly, performance of such computer systems may be directly dependent on how efficiently home agent data and/or memory is managed.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
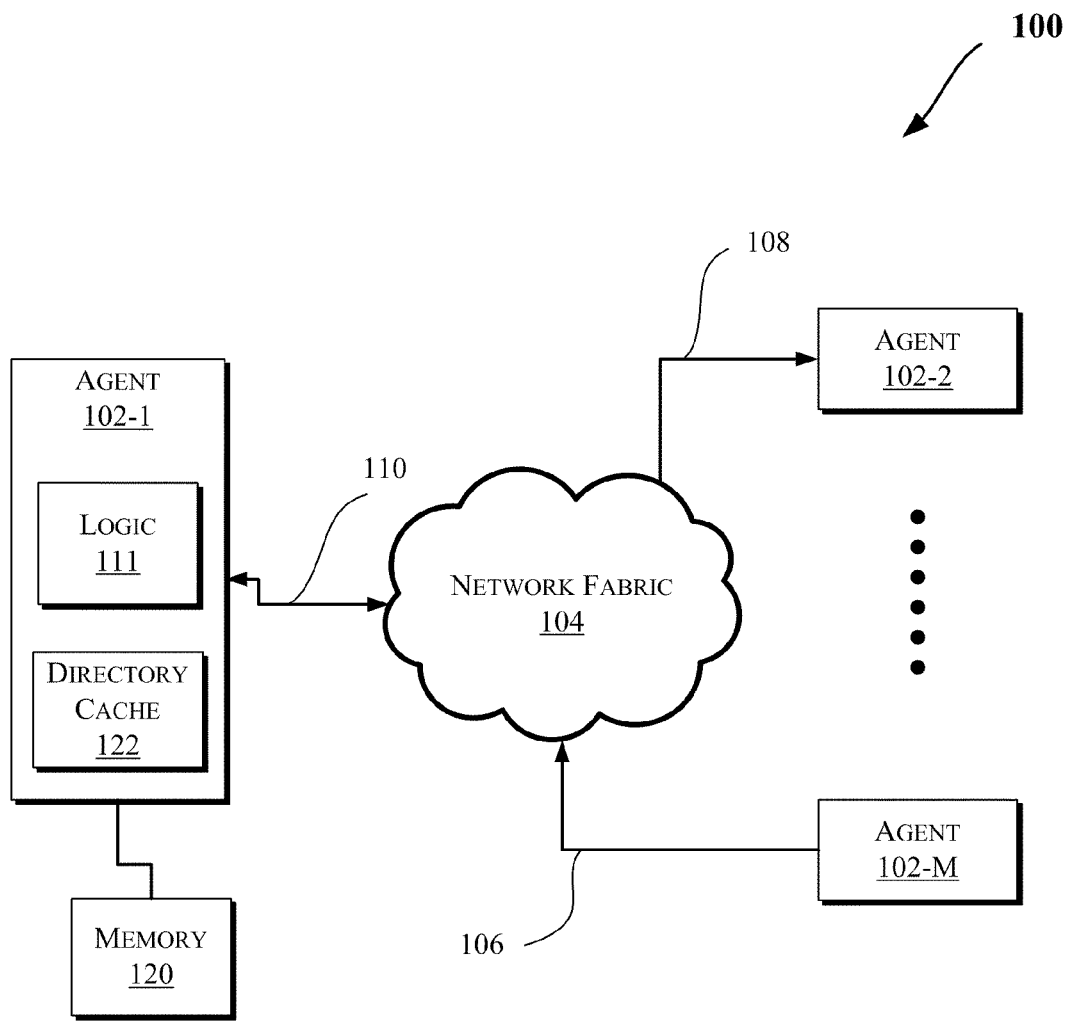
FIGS. 1-2 and 8-9 illustrate block diagrams of embodiments of computing systems, which may be utilized to implement various embodiments discussed herein.

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Some embodiments discussed herein are generally related to memory mirroring and/or migration at a home agent. In an embodiment, migration and/or mirroring functionality may be implemented seamlessly over an interconnect network (such as the network fabric discussed herein, e.g., with reference to FIG. 1). Also, memory may be copied on a memory controller granularity (e.g., as opposed to memory device level sparing (such as Dual In-line Memory Module (DIMM) or Dynamic Random Access Memory (DRAM) level) which copies on memory device level granularity). Further, reads to the slave HA may be forwarded upon receiving an UNCORR response (indicating an uncorrectable error) from the primary memory controller, thus increasing up time. Additionally, the mirroring and/or migration may be transparent to the operating system in an embodiment.

Generally, cache memory in computing systems may be kept coherent using a snoopy bus or a directory based protocol. In either case, a system memory address may be associated with a particular location in the system. This location is generally referred to as the "home node" of the memory address. In a directory based protocol, processing/caching agents may send requests to the home node for access to a memory address with which a "home agent" is associated. Moreover, in distributed cache coherence protocols, caching agents may send requests to home agents which control coherent access to corresponding memory spaces. Home agents are, in turn, responsible for ensuring that the most recent copy of the requested data is returned to the requestor either from memory or a caching agent which owns the requested data. The home agent may also be responsible for invalidating copies of data at other caching agents if the request is for an exclusive copy, for example. For these purposes, a home agent generally may snoop every caching agent or rely on a directory (e.g., directory cache 122 of FIG. 1 or a copy of the directory stored in a memory, such as memory 120 of FIG. 1) to track a set of caching agents where data may reside. In an embodiment, the directory cache 122 may include a full or partial copy of the directory stored in the memory 120.

In accordance with one embodiment, in a directory-based cache coherence protocol, one or more agents that guard or manage the memory (called home agents, or HA's) may collectively maintain a directory that, in part, tracks where and in what state each cache line is cached in the system (such as in a Quick Path Interface (QPI) system). A caching agent (CA) wishing to acquire a cache line sends its request to a HA, which looks up the directory and sends snoops to only those CA's which the directory indicates may have cached copies of that line. If the directory knows that no cached copies exist, or that only shared copies exist and the request is for another shared copy, no snoops need be sent at all and the request is satisfied from memory. Thus, the directory may eliminate (or at least reduces) the need of snooping all CA's for each request and reduces the bandwidth requirement of snoops. The system allows a CA to request a cache line that has already been modified in the cached hierarchy. Such a CA request is referred to herein as a buriedM request. In one embodiment, a buriedM flow with the addition of a single bit in the tracker (DEFUNCT bit) is provided (see, e.g., FIG. 6). Moreover, since re-ordering data structures such as conflict lists to support OOO (Out Of Order) completions can become very expensive in hardware (for example, as a result of hardware utilization and/or latency associated with re-ordering), an embodiment allows a HA to support buriedM without having to re-order the conflict list at the HA.

Additionally, as discussed above, the directory eliminates (or at least reduces) the need of snooping all CA's for each request and reduces the bandwidth requirement of snoops. Further, the HA may receive conflicting requests from different CAs to the same cache line. In an embodiment, it is the responsibility of the HA to serialize such conflicting requests, and ensure that all CAs are serviced in a fair order. Moreover, in a source-snoop coherence protocol, the HA may resolve conflicts by keeping a list of conflictors for a conflicting cache line. It then services the conflictors in a FIFO (First-In, First-Out) manner. This list generally scales with the number of caching agents in the system and can become prohibitively large in large glueless (e.g., 8-socket and above) configurations. However, in a home-snoop directory based coherence protocol, the HA can exploit the definition of the protocol to restrict this list to just a single bit in accordance with one embodiment (e.g., as discussed with reference to FIG. 7).

As discussed herein:

"primary" refers to the primary home agent, e.g., source of the migration/mirroring operation;

"slave" or "mirror" refers to the slave/mirror home agent, e.g., target of the migration/mirroring operation;

"migration" refers to the process of building a consistent data copy at the slave. All writes (implicit writeback (IWB), explicit writeback (EWB)) at the primary will also be sent to the slave (as an NcWr[Ptl]);

"mirroring" refers to the slave having a consistent data copy (e.g., continue to send IWBs/EWBs to the slave, additionally, reads that result in an uncorrected response at the primary memory controller sent to the slave for data);

"read failover" (during mirroring) refers to sending a read from the primary to the slave when a read at the primary encounters an uncorrected error;

"hard failover" (during mirroring) refers to unconditionally sending reads to the slave since the primary memory controller is determined to be dead (either because a write to the primary failed, or N number of reads encountered an uncorrected error, and N exceeds the programmed threshold);

"HA Failover" (post migration) refers to reprogramming the address decoder to point to the slave HA for memory references, thus making it the new primary HA;

"primary_dead" refers to the primary memory controller is considered dead/unusable; and "slave_dead" refers to the slave memory controller is considered dead/unusable.

Various computing systems may be used to implement embodiments, discussed herein, such as the systems discussed with reference to FIGS. 1 and 8-9. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIGS. 8-9.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with Fully Buffered Dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Additionally, at least one of the agents 102 may be a home agent and one or more of the agents 102 may be requesting or caching agents as will be further discussed herein. As shown, at least one agent (only one shown for agent 102-1) may include or have access to one or more logics (or engines) 111 to mirror data, migrate data, resolve buriedM, and/or resolve conflict(s), as discussed herein, e.g., with reference to FIGS. 3-7. Further, in an embodiment, one or more of the agents 102 (only one shown for agent 102-1) may have access to a memory (which may be dedicated to the agent or shared with other agents) such as memory 120. Also, one or more of the agents 102 (only one shown for agent 102-1) may maintain entries in one or more storage devices (only one shown for agent 102-1, such as directory cache(s) 122, e.g., implemented as a table, queue, buffer, linked list, etc.) to track information about items stored/maintained by the agent 102-1 (as a home agent) and/or other agents (including CAs for example) in the system. In some embodiments, each or at least one of the agents 102 may be coupled to the memory 120 and/or a corresponding directory cache 122 that are either on the same die as the agent or otherwise accessible by the agent.

Figure 2:
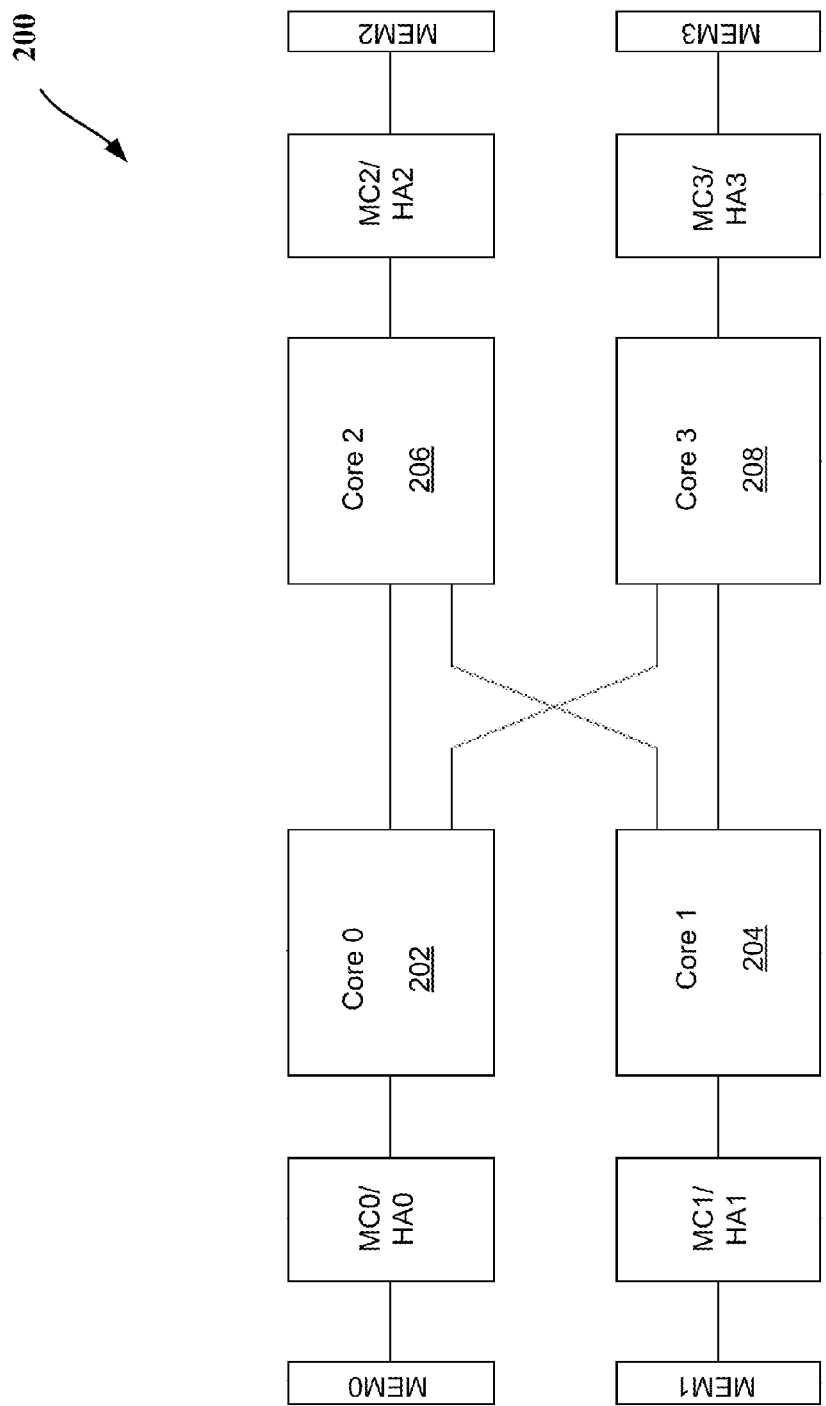

FIG. 2 is a block diagram of a computing system in accordance with an embodiment. System 200 may include a plurality of sockets 202-208 (four shown but some embodiments may have more or less socket). Each socket may include a processor in an embodiment. Also, each socket may be coupled to the other sockets via point-to-point (PtP) link such as discussed with reference FIG. 9. As discussed with respect to FIG. 1 with reference to the network fabric 104, each socket may be coupled to a local portion of system memory, e.g., formed of a plurality of Dual Inline Memory Modules (DIMMs) that may include dynamic random access memory (DRAM).

As shown in FIG. 2, each socket may be coupled to a memory controller (MC)/Home Agent (HA) (such as MC0/HA0 through MC3/HA3). The memory controllers may be coupled to a corresponding local memory (labeled as MEM0 through MEM3), which may be a portion of system memory (such as memory 912 of FIG. 9). In some embodiments, the memory controller (MC)/Home Agent (HA) (such as MC0/HA0 through MC3/HA3) may be the same or similar to agent 102-1 of FIG. 1 (e.g., including logic 111, etc.) and the memory, labeled as MEM0 through MEM3, may be the same or similar to memory 120 of FIG. 1. Also, in one embodiment, MEM0 through MEM3 may be configured to mirror data, e.g., as master and slave. Also, one or more components of system 200 may be included on the same integrated circuit die in some embodiments.

An implementation such as shown in FIG. 2 thus may be for a socket glueless configuration with mirroring. For example, data assigned to a memory controller (such as MC0/HA0) may be mirrored to another memory controller (such as MC3/HA3) over the PtP links. Also, the directory associated with memory controller MC3/HA3 may initialized in the unknown (U)-state upon a copy to mirror. Upon failover to this controller (e.g., due to an online service-call for this memory controller), the directory may be reconstructed from the U-state.

In an embodiment, Software Abstraction Layer (such as BIOS (Basic Input/Output System)) migration flow may include marking all lines of source memory as "M" (indicating modification/migration of the corresponding line), e.g., using a semaphore loop.

For instance, the following pseudo code may be use for each 64B cache-line:

```
// r2 is the address of the lowest 8-bytes of the 64B cache line
ld8 r1 <- [r2]
mov ar.ccv <- r1
// compare ar.ccv with [r2], if successful then write r1 back to [r2], if not
successful then line has already been modified by another agent
cmpxchg r8 <- [r2], r1, ar.ccv
;;
Fc r2
```

The flushing of the cache line (Fc r2 in the pseudo-code above) will cause data to be written to the HA. If migration is enabled at the HA, the data will be copied to the slave.

Figure 3:
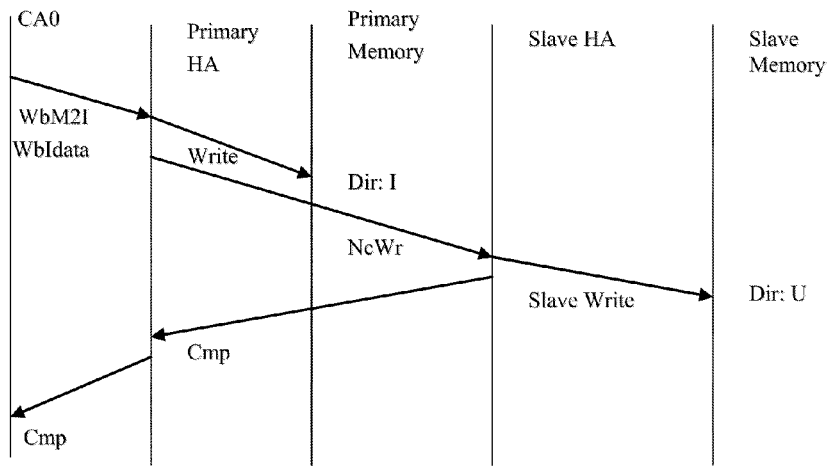
FIGS. 3-7 illustrate flow diagrams according to some embodiments.

Operations discussed with reference to FIGS. 3-7 may be performed by components discussed with reference to FIG. 1, 2, 8, or 9, where FIG. 3 illustrates a flow diagram of migration flow of an explicit writeback operation, according to an embodiment. As shown, CA0 sends an explicit writeback (WbM2i/WbIdata, e.g., indicating CA0 is evicting a cache line after a prior store operation on that cache line) to the primary HA. Migration is enabled at the HA. The primary HA writes the data (Write) to primary memory (where directory is I), in addition, in migration mode, the primary HA sends an NcWr (e.g., Non-cohWrite—indicating a copy of the data is being sent to the slave) to the slave HA. The slave HA commits the write to the slave memory (directory is U) and sends a completion (Cmp) to the primary HA. After the primary HA receives the Cmp from the slave HA, it sends a completion (Cmp) to the original requestor CA0.

Figure 4:
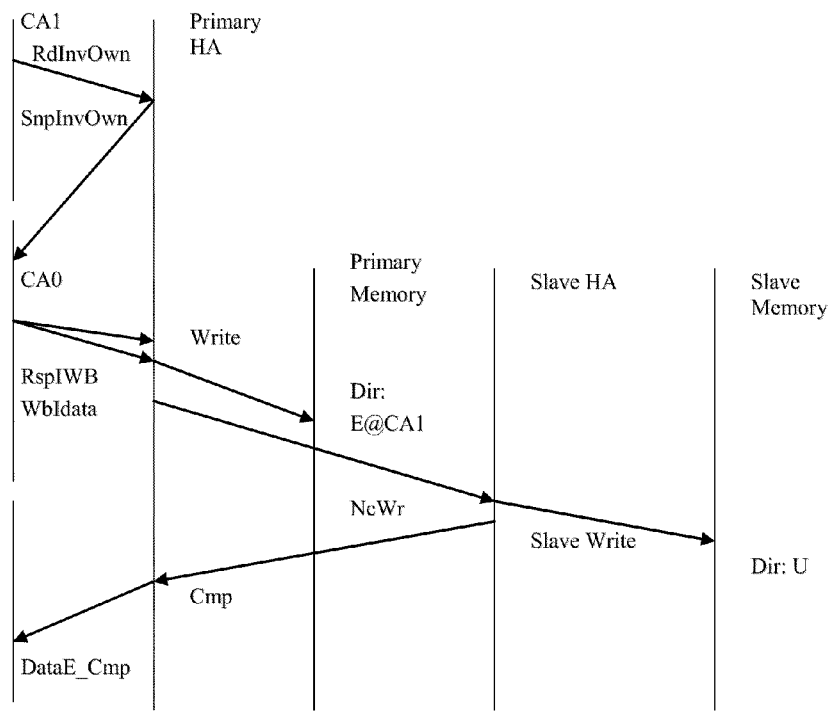

FIG. 4 illustrates a flow diagram of migration flow of an implicit writeback operation, according to an embodiment. As shown, the primary HA sends a SnpInvOwn (e.g., indicating a snoop to invalidate the current owner) to CA0 on behalf of the RdInvOwn (e.g., indicating read for ownership) from CA1. In turn, the SnpInvOwn results in an implicit write back (RspIWb/WbIData, e.g. indicating CA0 is writing back dirty data) from CA0. The primary HA commits the write to primary memory (directory is E@CA1). In addition, the primary HA sends an NcWr to the slave HA. The slave HA commits the write to the slave memory (directory is U) and sends a Cmp (e.g., indicating completion) to the primary HA. Upon receiving the Cmp from the slave HA, the primary HA sends the DataE_Cmp to CA1 to complete the request.

Figure 5:
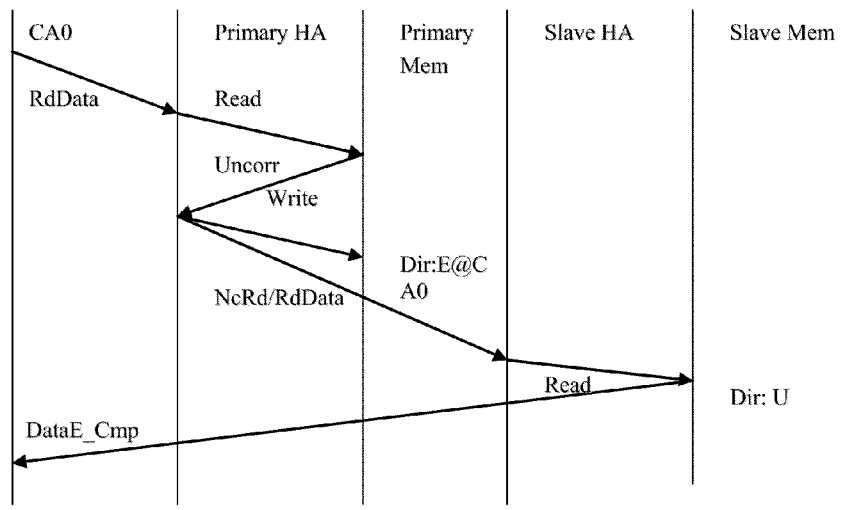

FIG. 5 illustrates a flow diagram of a read failover operation, according to an embodiment. With respect to read failover in mirroring, when a primary-read returns uncorrectable signal (UNCORR), broadcast snoops to all agents in the participant vector (assuming a miss in the directory cache) and resolve snoop responses. Furthermore, the read to the mirror (assuming there is no dirty writeback from the snoops) may be bounced and data supplied to the requestor directly from the mirror agent.

In an embodiment, read failover may be done on a line by line basis rather than losing access to the entire primary memory on the first encounter of an uncorrectable error. An embodiment implements a programmable threshold counter (counting the number of uncorrectable errors) and for read operations only disable the entire memory controller after this threshold has been exceeded. The entire memory controller maybe disabled (e.g. due to hard failover) after a single uncorrectable error on a write operation, or if the primary memory controller signals a link. The correct data at the slave may not be proactively written back into the primary. However, the memory controller may log the address of the uncorrectable error and signal a recoverable error. Logic (e.g., logic 111) may also acquire ownership of the line and flush it to the primary without any change to the data.

For directory updates at the primary, the uncorrectable line may have been written back at the primary as poisoned. In such cases, subsequent reads of the line would not receive an UNCORR response from the memory controller (assuming soft error resulted in the UNCORR), instead a poisoned line is returned. A poisoned line would cause the HA to bounce the read to the slave HA as well.

With respect to HA failover (post migration), the flow after pointing caching agent address decoders to the old slave (new primary) is as follows in accordance with one embodiment. First, any line that hits the U (Unknown) state in the new primary directory will broadcast snoops. The HA will issue SnpInv*(and mark the line in the E state in the directory) whenever a read occurs and the directory indicates U in a FBD directory (e.g., which may be stored in the directory cache 122 and/or memory 120 of FIG. 1). Note that the old slave (new primary) directory may be written as U during the migration/write-mirroring process.

In an embodiment, it is not required to run a flush or Read for Ownership loop through the address space to remove the U-state in the directory, in part, because on the first access to a U state line, the HA may mark the line in the E state (RdCode/RdData/RdCur requests will broadcast SnpInvItoE and mark the line E at the requestor). Invalidating requests (RdInvOwn, InvI2E) may also be marking the line as E at the requestor). EvictCln (e.g., indicating evicting a clean line command) to a U-state line will continue to leave the line in the U-state.

Referring to FIG. 5, CA0 sends a RdData to the primary HA. The corresponding read from the primary HA results in an UNCORR response. The primary HA redirects the read to the slave HA (via an NCRd), in addition it writes the directory in the primary HA to E@CA0. Note that the poison bit may be set in the primary memory. Upon receiving the NcRd, the slave HA reads the slave memory, and sends a DataE_Cmp directly back to the original requestor CA0 (note that the slave directory continues to remain in the U state).

In an embodiment, with respect to mirroring/migration flows, the following flow is adopted on reads that failover to the slave home agent. Primary home agent issues an NcRdPtl (e.g., indicating Non-coherentReadPartial command, which is a special command used for sending failover reads) to the slave home agent with the following parameters. The primary home agent sends this packet as a "fire and forget" packet (e.g., where no response will be expected from the primary home agent).

- RHNID—The NID (Network Identifier) of the requester of the transaction causing the read fail-over. This may be abbreviated as Orig_Req_RHNID
- RTID—RTID (Transaction Identifier) of the transaction causing the read failover. This will be abbreviated as Orig_RTID
- DNID—Slave Home NID. This will be abbreviated as Slave_NID
- Length field in NCRdPtl—'00—dataNC, 01—dataI, 10—dataE, 11—dataS—Indicates to slave how data should be returned The Slave home agent may issue the DataC* or DataNC packet to the original requester with the following param eters. Note that the slave may not send a response back to the primary home agent:

RHNID—Primary_Home_agent NID (from a CSR in the slave HA)
RTID—RTID of NcRdPtl (Orig_RTID)
DNID—RHNID of the NcRdPtl. This may be the same as the Orig_Requester_RHNID One advantage of this scheme is that the primary home agent flows for mirroring-failover are much simpler since it does not need to receive data from the slave and forward that along to the original requestor. In addition, the spoofed Read to the slave looks similar to a normal read from the point of view of the slave, so only small changes are required to the home agent acting as a slave.

In one embodiment, the primary agent does not receive a response to the transaction it issued (NcRdPtl). Normally it should receive a DataNC in this case. Instead this behavior relies on an "agreement" (which may be made at initialization) between primary and secondary home agents that the secondary home agent will satisfy the original request and not satisfy the apparent request from primary to secondary. In addition, the primary may tunnel information to the slave using the length of lower address bits of the NcRdPtl (which are not needed for fail-over reads in some embodiments). The slave may in turn use this tunneled information to determine the proper response type as indicated above.

Also, the request from the primary to the secondary is still a different "globally unique ID" because the DNID is unique (i.e., the DNID from primary to secondary is different from the DNID in the original request/transaction. The original requesting caching agent is not affected by any of such changes.

In some embodiments, the Write mirroring flow works as follows. The primary home agent issues an NcWr[Ptl] to the slave home agent to commit write data (from an implicit/explicit writeback, or ncwr):

RHNID—Original Requestor RHNID
RTID—Original Requestor RTID
DNID—Slave Home Node DNID The slave home agent (e.g., after committing the write to the slave memory controller) may respond with a Cmp packet to the primary home agent. In one embodiment, this packet has the following fields: (1) RHNID—Slave home agent NID; (2) RTID—RTID from NcWr[ptl]. In this case it is original requestor RTID; (3) DNID—The NID of the primary configuration-agent (ubox) ([5:3]—primary HA socket bits, [2:0]—ubox nid (0×2)); and/or (4) RSNID—RHNID from NcWr[ptl].

Figure 6:
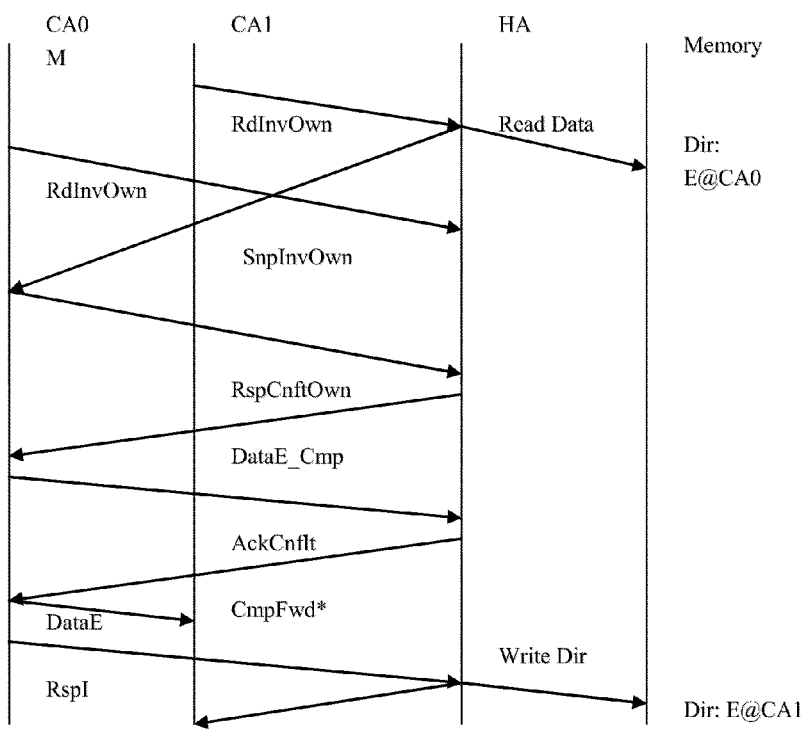

FIG. 6 illustrates a flow diagram of buried M operations, according to an embodiment. In some embodiments, HA implementations service multiple requests to the same cache line in a FIFO fashion. Referring to FIG. 6, CA1 sends a RdInvOwn to address A. Since the HA sees this request first, it commits itself to servicing it first. The address in question is modified in CA0's cache hierarchy (as indicated by "M" in FIG. 6). Yet, CA0 has also sent a request out to the same address. CA0's request is sunk (or dropped) in the tracker data structure in the HA. The directory at the HA may reflect the fact that the address is E@CA0. As a result, the HA sends a SnpInvOwn to CA0 (on behalf of CA1's request). When CA0 receives the response, it responds RspCnfltOwn (e.g., indicating CA0 has received a conflicting snoop to a line that is marked Modified in CA0's cache hierarchy). This is because the line is buriedM in its cache hierarchy.

As discussed above, the HA has already committed to servicing CA1, it still needs to snoop out the most recent copy of the line from CA0's caches. One way the HA can do this is by first completing CA0's Out-Of-Order (OOO). The HA completes CA0's request OOO, and sets a bit in CA0's tracker entry indicating that the current request is DEFUNCT. It then completes a late conflict handshake with CA0, extracting the most recent copy of the line from CA0's caches. The most recent copy of the line is forwarded to CA1, and the HA eventually completes CA1's request. When CA0's original request comes up for service at the HA, the HA detects that the request is already marked DEFUNCT, which implies that the request has completed OOO. The request from CA0 is therefore simply dropped by the HA.

In some embodiments, the above flow may be modified such that (when HA completes CA0's request OOO) CA0 may send another request to reuse the same tracker-index after it receives its OOO completion response and finishes its conflict handshake. In such a situation, the HA may mark CA0's tracker entry as ACTIVE again. Later when CA0's (newer) request comes up for service, it is completed normally by the HA.

Accordingly, in one embodiment, a buriedM flow with the addition of a single bit in the tracker (DEFUNCT bit) is provided. Re-ordering data structures such as conflict lists to support OOO (Out Of Order) completions is very expensive in hardware. An embodiment allows the HA to support buriedM without having to re-order the conflict list at the HA.

Figure 7:
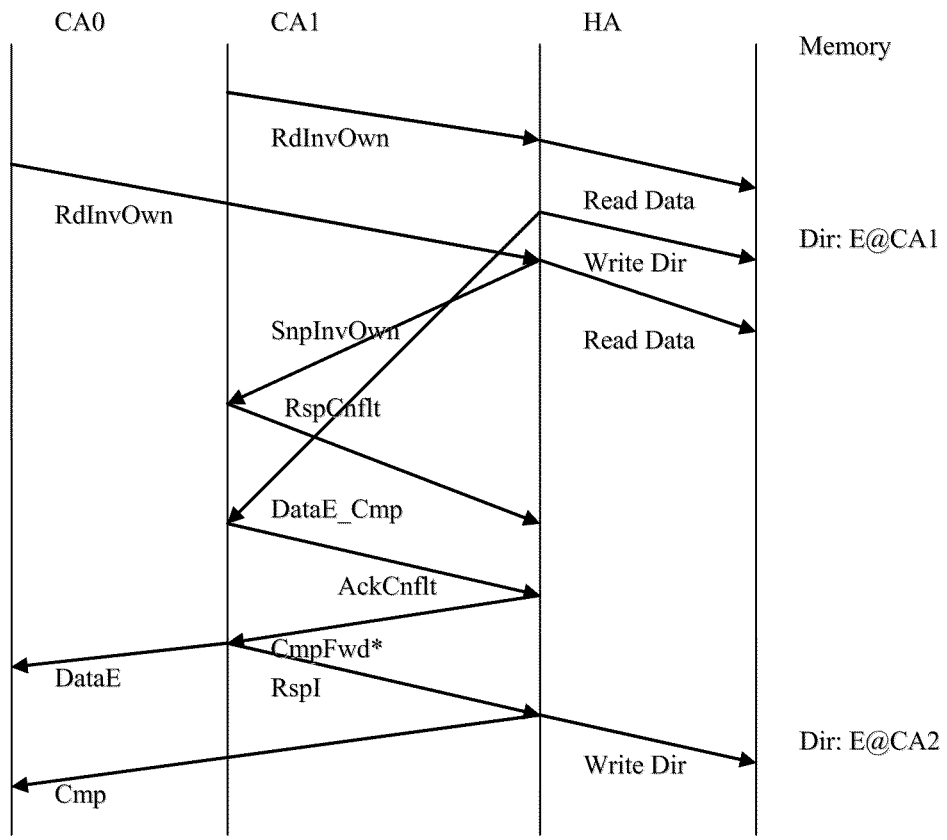

FIG. 7 illustrates a flow diagram of conflict handling operations, according to an embodiment. In an embodiment, the HA is to pre-allocate space for all CA requests in the system. This pre-allocated data structure is defined as the "Tracker". In a source-snoop protocol, each tracker entry may have a vector of conflicting tracker entries. For example, for a 512 entry tracker (9 bit tracker index), each entry would have 9×16=144 bit wide conflict list—assuming 16 CAs in system, each socket in an 8-socket glueless configuration has two logical CAs, this is a typical 8-socket glueless configuration. The total storage used for all conflict lists would be 512×144 (73728 bits). In contrast, in an embodiment, on the HA (a home-snoop directory based HA), conflicts are tracked by just a single bit in the tracker entry.

In some embodiments, such a scheme may consider two types of conflicts. The early conflict is a type of conflict where the conflicting CA does not yet have a copy of the cache line. In an embodiment, the HA ignores such conflicts, and treats the conflicting snoop response as a normal snoop response. The second type of conflict is called a late (or true) conflict. In such a conflict, the CA providing the conflict response really has the latest copy of the line. In such a case, it is the responsibility of the HA to send a second (follow-up) snoop to extract the most recent copy of the line. When the HA receives a late conflict snoop response, it may set a bit in the response sender's tracker entry. The bit indicates that the CA (who sent the conflict response) is involved in a late conflict. Moreover, the CA (who sent the conflict response) may follow up the response with an "AckCnflt" message. When the HA receives an AckCnflt response to a tracker index that has the late conflict bit set, it may send a CmpFwd (a type of snoop) response. This allows the HA to extract the most recent copy of the line from the CA who sent the late conflict response.

Referring to FIG. 7, the HA sends a DataE_Cmp response to CA1 to complete its request. It updates the directory for the cache line to Exclusive@CA1. The HA next snoops CA1 on behalf of a RdInvOwn request from CA2 (the HA implements a directory based home snoop protocol in an embodiment). The snoop to CA1 passes the DataCE_Cmp in the system fabric. CA1 responds with RspCnflt since from its perspective its request has still not completed. When the HA receives the RspCnflt from CA1, it looks at the corresponding tracker entry, and notices that CA1's request has already been completed, it sets a bit in CA1's tracker entry, and waits for the AckCnflt (which may be required in some embodiments).

When the AckCnflt from CA1 arrives, the HA notices that the late conflict bit in CA1's tracker entry is set. It therefore sends a CmpFwd* snoop to CA1, asking it to forward the cache line to the next conflictor (CA2). Receiving an AckCnflt without the late conflict bit being set would have caused the HA to send a Cmp response, not a snoop (CmpFwd) response. The HA then waits for the response to the snoop (CmpFwd). CA2's request is finally completed when the snoop response is received.

As can be seen, unlike the data structure demands from a source-snoop protocol, in the home-snoop protocol, the HA may resolve conflicts via just an extra bit in the conflictor's tracker entry. Accordingly, very limited storage (e.g., one bit per tracker entry) may be used to resolve conflicts. This in turn allows for scale up implementations to address larger market segment. Also, since only one extra bit per tracker entry is needed to resolve conflicts, such an embodiment makes design much more scalable, e.g., than the source-snoopy counterparts.

Figure 8:
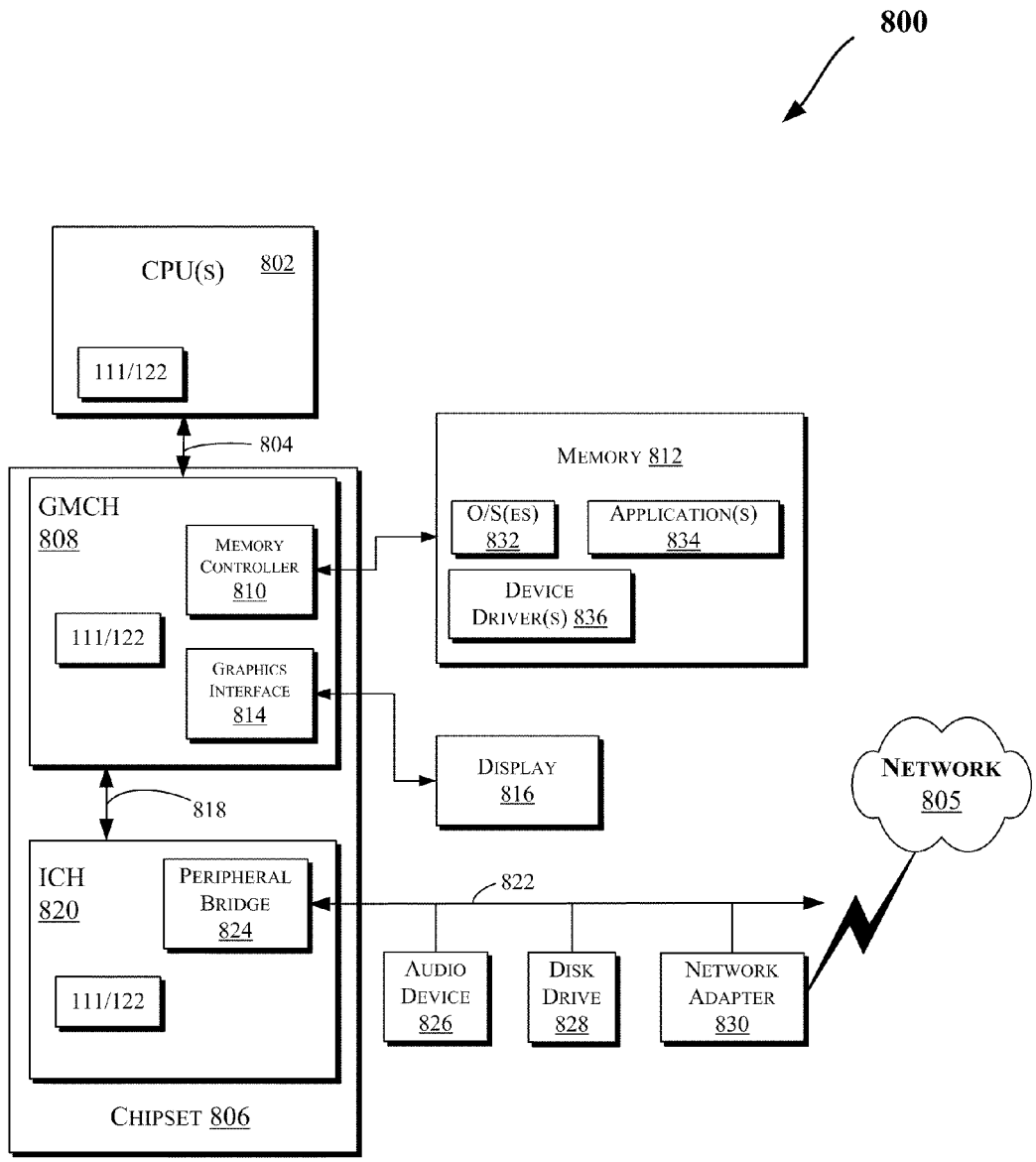

FIG. 8 illustrates a block diagram of an embodiment of a computing system 800. One or more of the agents 102 of FIG. 1 may comprise one or more components of the computing system 800. Also, various components of the system 800 may include a directory cache (e.g., such as directory cache 122 of FIG. 1) and/or a logic (such as logic 111 of FIG. 1) as illustrated in FIG. 8. However, the directory cache and/or logic may be provided in locations throughout the system 800, including or excluding those illustrated. The computing system 800 may include one or more central processing unit(s) (CPUs) 802 (which may be collectively referred to herein as "processors 802" or more generically "processor 802") coupled to an interconnection network (or bus) 804. The processors 802 may be any type of processor such as a general purpose processor, a network processor (which may process data communicated over a computer network 805), etc. (including a reduced instruction set computer (RISC) processor or a complex instruction set computer (CISC)). Moreover, the processors 802 may have a single or multiple core design. The processors 802 with a multiple core design may integrate different types of processor cores on the same integrated circuit (IC) die. Also, the processors 802 with a multiple core design may be implemented as symmetrical or asymmetrical multiprocessors.

The processor 802 may include one or more caches (e.g., other than the illustrated directory cache 122), which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 800. Additionally, such cache(s) may be located in various locations (e.g., inside other components to the computing systems discussed herein, including systems of FIG. 1, 2, 8, or 9).

A chipset 806 may additionally be coupled to the interconnection network 804. Further, the chipset 806 may include a graphics memory control hub (GMCH) 808. The GMCH 808 may include a memory controller 810 that is coupled to a memory 812. The memory 812 may store data, e.g., including sequences of instructions that are executed by the processor 802, or any other device in communication with components of the computing system 800. Also, in one embodiment of the invention, the memory 812 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 804, such as multiple processors and/or multiple system memories.

The GMCH 808 may further include a graphics interface 814 coupled to a display device 816 (e.g., via a graphics accelerator in an embodiment). In one embodiment, the graphics interface 814 may be coupled to the display device 816 via an accelerated graphics port (AGP). In an embodiment of the invention, the display device 816 (such as a flat panel display) may be coupled to the graphics interface 814 through, for example, a signal converter that translates a digital representation of an image stored in a storage device such as video memory or system memory (e.g., memory 812) into display signals that are interpreted and displayed by the display 816.

As shown in FIG. 8, a hub interface 818 may couple the GMCH 808 to an input/output control hub (ICH) 820. The ICH 820 may provide an interface to input/output (I/O) devices coupled to the computing system 800. The ICH 820 may be coupled to a bus 822 through a peripheral bridge (or controller) 824, such as a peripheral component interconnect (PCI) bridge that may be compliant with the PCIe specification, a universal serial bus (USB) controller, etc. The bridge 824 may provide a data path between the processor 802 and peripheral devices. Other types of topologies may be utilized. Also, multiple buses may be coupled to the ICH 820, e.g., through multiple bridges or controllers. Further, the bus 822 may comprise other types and configurations of bus systems. Moreover, other peripherals coupled to the ICH 820 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 822 may be coupled to an audio device 826, one or more disk drive(s) 828, and a network adapter 830 (which may be a NIC in an embodiment). In one embodiment, the network adapter 830 or other devices coupled to the bus 822 may communicate with the chipset 806. Also, various components (such as the network adapter 830) may be coupled to the GMCH 808 in some embodiments of the invention. In addition, the processor 802 and the GMCH 808 may be combined to form a single chip. In an embodiment, the memory controller 810 may be provided in one or more of the CPUs 802. Further, in an embodiment, GMCH 808 and ICH 820 may be combined into a Peripheral Control Hub (PCH).

Additionally, the computing system 800 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 828), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 812 may include one or more of the following in an embodiment: an operating system (O/S) 832, application 834, directory 801, and/or device driver 836. The memory 812 may also include regions dedicated to Memory Mapped I/O (MMIO) operations. Programs and/or data stored in the memory 812 may be swapped into the disk drive 828 as part of memory management operations. The application(s) 834 may execute (e.g., on the processor(s) 802) to communicate one or more packets with one or more computing devices coupled to the network 805. In an embodiment, a packet may be a sequence of one or more symbols and/or values that may be encoded by one or more electrical signals transmitted from at least one sender to at least on receiver (e.g., over a network such as the network 805). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 805).

In an embodiment, the application 834 may utilize the O/S 832 to communicate with various components of the system 800, e.g., through the device driver 836. Hence, the device driver 836 may include network adapter 830 specific commands to provide a communication interface between the O/S 832 and the network adapter 830, or other I/O devices coupled to the system 800, e.g., via the chipset 806.

In an embodiment, the O/S 832 may include a network protocol stack. A protocol stack generally refers to a set of procedures or programs that may be executed to process packets sent over a network 805, where the packets may conform to a specified protocol. For example, TCP/IP (Transport Control Protocol/Internet Protocol) packets may be processed using a TCP/IP stack. The device driver 836 may indicate the buffers in the memory 812 that are to be processed, e.g., via the protocol stack.

The network 805 may include any type of computer network. The network adapter 830 may further include a direct memory access (DMA) engine, which writes packets to buffers (e.g., stored in the memory 812) assigned to available descriptors (e.g., stored in the memory 812) to transmit and/or receive data over the network 805. Additionally, the network adapter 830 may include a network adapter controller, which may include logic (such as one or more programmable processors) to perform adapter related operations. In an embodiment, the adapter controller may be a MAC (media access control) component. The network adapter 830 may further include a memory, such as any type of volatile/nonvolatile memory (e.g., including one or more cache(s) and/or other memory types discussed with reference to memory 812).

Figure 9:
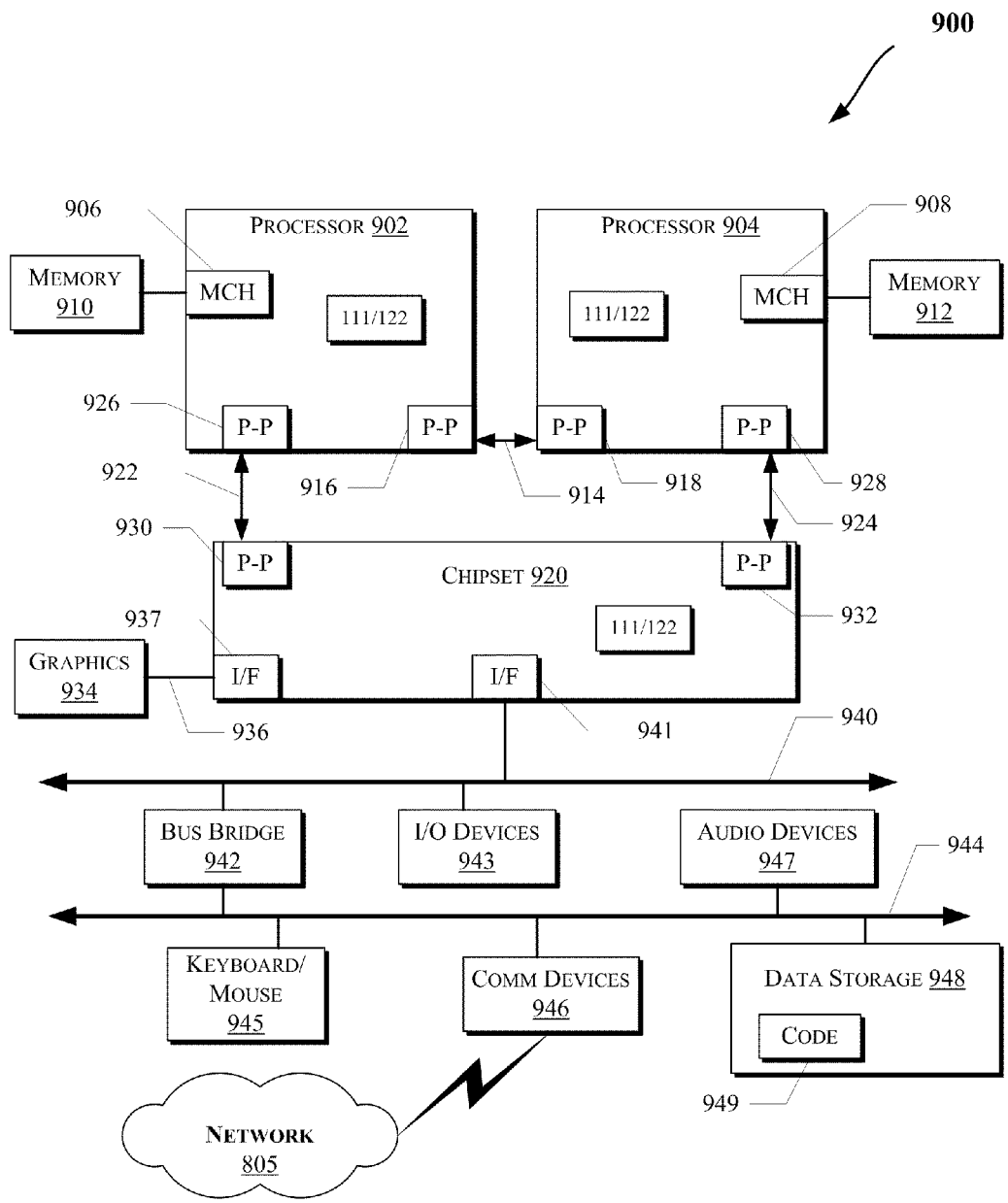

FIG. 9 illustrates a computing system 900 that is arranged in a point-to-point (PtP) configuration, according to an embodiment of the invention. In particular, FIG. 9 shows a system where processors, memory, and input/output devices are interconnected by a number of point-to-point interfaces. The operations discussed with reference to FIGS. 1-8 may be performed by one or more components of the system 900.

As illustrated in FIG. 9, the system 900 may include several processors, of which only two, processors 902 and 904 are shown for clarity. The processors 902 and 904 may each include a local memory controller hub (GMCH) 906 and 908 to enable communication with memories 910 and 912. The memories 910 and/or 912 may store various data such as those discussed with reference to the memory 912 of FIG. 9. As shown in FIG. 9, the processors 902 and 904 (or other components of system 900 such as chipset 920, I/O devices 943, etc.) may also include one or more cache(s) such as those discussed with reference to FIGS. 1-8.

In an embodiment, the processors 902 and 904 may be one of the processors 902 discussed with reference to FIG. 9. The processors 902 and 904 may exchange data via a point-to-point (PtP) interface 914 using PtP interface circuits 916 and 918, respectively. Also, the processors 902 and 904 may each exchange data with a chipset 920 via individual PtP interfaces 922 and 924 using point-to-point interface circuits 926, 928, 930, and 932. The chipset 920 may further exchange data with a high-performance graphics circuit 934 via a high-performance graphics interface 936, e.g., using a PtP interface circuit 937.

In at least one embodiment, a directory cache and/or logic may be provided in one or more of the processors 902, 904 and/or chipset 920. Other embodiments of the invention, however, may exist in other circuits, logic units, or devices within the system 900 of FIG. 9. Furthermore, other embodiments of the invention may be distributed throughout several circuits, logic units, or devices illustrated in FIG. 9. For example, various components of the system 900 may include a directory cache (e.g., such as directory cache 122 of FIG. 1) and/or a logic (such as logic 111 of FIG. 1). However, the directory cache and/or logic may be provided in locations throughout the system 900, including or excluding those illustrated.

The chipset 920 may communicate with the bus 940 using a PtP interface circuit 941. The bus 940 may have one or more devices that communicate with it, such as a bus bridge 942 and I/O devices 943. Via a bus 944, the bus bridge 942 may communicate with other devices such as a keyboard/mouse 945, communication devices 946 (such as modems, network interface devices, or other communication devices that may communicate with the computer network 905), audio I/O device, and/or a data storage device 948. The data storage device 948 may store code 949 that may be executed by the processors 902 and/or 904.

In various embodiments of the invention, the operations discussed herein, e.g., with reference to FIGS. 1-9, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-9. Additionally, such computer-readable media may be downloaded as a computer program product, wherein the program may be transferred from a remote computer (e.g., a server) to a requesting computer (e.g., a client) through data signals provided in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   a first agent to store data in a first memory coupled to the first agent; and
   a first logic to mirror the stored data in the first memory at a second agent, wherein the mirrored data is to be copied at a memory controller granularity, wherein a bit for an entry of a directory is to indicate whether a caching agent, which sent a conflict response, is involved in a late conflict, wherein the late conflict is to indicate that the caching agent has the latest copy of conflicting data, and wherein the first logic is to mirror the stored data based on a read failover, wherein the first agent and the second agent are to maintain the directory, the directory to store information about at which agent and in what state each cache line is cached, wherein one or more snoops, corresponding to a request, are only sent to one or more home agents that are indicated by the directory to include a cached copy of data corresponding to the request.

2. The apparatus of claim 1, wherein the first logic is to mirror the stored data based on one of an explicit writeback and an implicit writeback.

3. The apparatus of claim 1, wherein the second agent is coupled to a second memory to store the mirrored data.

4. The apparatus of claim 3, further comprising a memory to comprise the first memory and the second memory.

5. The apparatus of claim 1, wherein a bit for an entry of the directory is to indicate whether that entry has been modified.

6. The apparatus of claim 1, wherein the first agent is to comprise the first logic.

7. An apparatus comprising:
   a first agent to store data in a first memory coupled to the first agent;
   a first logic to mirror the stored data in the first memory at a second agent, wherein the mirrored data is to be copied at a memory controller granularity, wherein a bit for an entry of a directory is to indicate whether a caching agent, which sent a conflict response, is involved in a late conflict, wherein the late conflict is to indicate that the caching agent has the latest copy of conflicting data, and wherein the first logic is to mirror the stored data based on a read failover; and
   a directory cache, coupled to the first agent, to store data corresponding to a plurality of caching agents coupled to the first agent, wherein the first agent is to update the directory cache in response to one or more snoop responses received from one or more of the plurality of caching agents.

8. An apparatus comprising:
   a first agent to store data in a first memory coupled to the first agent;
   a first logic to mirror the stored data in the first memory at a second agent, wherein the mirrored data is to be copied at a memory controller granularity, wherein a bit for an entry of a directory is to indicate whether a caching agent, which sent a conflict response, is involved in a late conflict, wherein the late conflict is to indicate that the caching agent has the latest copy of conflicting data, and wherein the first logic is to mirror the stored data based on a read failover; and
   a directory cache, coupled to the first agent, to store data corresponding to a plurality of caching agents coupled to the first agent, wherein the first agent is to send one or more snoops to one or more of the plurality of caching agents identified by the directory cache to have a copy of the data corresponding to the target address.

9. The apparatus of claim 1, wherein the first agent is a home agent and the second agent is a slave agent.

10. The apparatus of claim 1, further comprising a serial link to couple the first agent and second agent.

11. The apparatus of claim 1, wherein the first agent and the second agent are on a same integrated circuit die.

12. The apparatus of claim 1, wherein the first logic is to migrate the stored data to the second agent.

13. A method comprising:
    storing data in a first memory coupled to a first agent;
    mirroring the stored data in the first memory at a second agent, wherein the mirrored data is to be copied at a memory controller granularity, wherein a bit for an entry of a directory is to indicate whether a caching agent, which sent a conflict response, is involved in a late conflict, and wherein the first logic is to mirror the stored data based on a read failover;
    maintaining the directory, the directory to store information about at which agent and in what state each cache line is cached; and
    sending one or more snoops, corresponding to a request, only to one or more home agents that are indicated by the directory to include a cached copy of data corresponding to the request.

14. The method of claim 13, wherein the mirroring of the stored data is to be performed based on one of an explicit writeback and an implicit writeback.

15. The method of claim 13, further composing storing the data from the first memory in a second memory coupled to the second agent.

16. The method of claim 13, wherein a bit for an entry of the directory is to indicate whether that entry has been modified.

17. A system comprising:
    a memory to store a directory, the directory to store information about at which agent and in what state each cache line is cached; and
    a first agent to store data in the memory, wherein the first agent is to comprise a first logic to mirror the stored data in the memory at a second agent,
    wherein the mirrored data is to be copied at a memory controller granularity, wherein a bit for an entry of the directory is to indicate whether a caching agent, which sent a conflict response, is involved in a late conflict, and wherein the first logic is to mirror the stored data based on a read failover, wherein one or more snoops, corresponding to a request, are only sent to one or more home agents that are indicated by the directory to include a cached copy of data corresponding to the request.

18. The system of claim 17, wherein the first logic is to mirror the stored data based on one of an explicit writeback and an implicit writeback.

19. The system of claim 17, wherein the second agent is coupled to the memory to store the mirrored data.

20. The system of claim 17, wherein a bit for an entry of the directory is to indicate whether that entry has been modified.

21. An apparatus comprising:
    a first agent to store data in a first memory coupled to the first agent; and
    a first logic to mirror the stored data in the first memory at a second agent, wherein the mirrored data is to be copied at a memory controller granularity, wherein a bit for an entry of a directory is to indicate whether a caching agent, which sent a conflict response, is involved in a late conflict, wherein the late conflict is to indicate that the caching agent has the latest copy of conflicting data, and wherein the first logic is to mirror the stored data based on a read failover, wherein the read failover is to be performed on a line by line basis.

22. An apparatus comprising:
a first agent to store data in a first memory coupled to the first agent; and
a first logic to mirror the stored data in the first memory at a second agent, wherein the mirrored data is to be copied at a memory controller granularity, wherein a bit for an entry of a directory is to indicate whether a caching agent, which sent a conflict response, is involved in a late conflict, wherein the late conflict is to indicate that the caching agent has the latest copy of conflicting data, and wherein the first logic is to mirror the stored data based on a read failover, wherein the first logic is to maintain access to the first memory after occurrence of a first uncorrectable error.

23. An apparatus comprising:
a first agent to store data in a first memory coupled to the first agent; and
a first logic to mirror the stored data in the first memory at a second agent, wherein the mirrored data is to be copied at a memory controller granularity, wherein a bit for an entry of a directory is to indicate whether a caching agent, which sent a conflict response, is involved in a late conflict, wherein the late conflict is to indicate that the caching agent has the latest copy of conflicting data, and wherein the first logic is to mirror the stored data based on a read failover, wherein the first logic is to maintain access to the first memory based on a threshold value.

* * * * *